(12) United States Patent
Heo

(10) Patent No.: US 6,385,571 B1
(45) Date of Patent: May 7, 2002

(54) HIGH QUALITY AUDIO ENCODING/DECODING APPARATUS AND DIGITAL VERSATILE DISC

(75) Inventor: Jae-Hoon Heo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/140,637

(22) Filed: Aug. 26, 1998

(30) Foreign Application Priority Data

Aug. 26, 1997 (KR) .............................. 97-41285

(51) Int. Cl.$^7$ ............................... G10L 19/02
(52) U.S. Cl. .................... 704/200.1; 704/501
(58) Field of Search ................ 704/200–201, 704/220–223, 226–230, 500, 501, 503, 504

(56) References Cited

U.S. PATENT DOCUMENTS

| | | | | |
|---|---|---|---|---|
| 5,537,510 A | * | 7/1996 | Kim ........................ | 704/229 |
| 5,649,052 A | * | 7/1997 | Kim ........................ | 704/226 |
| 5,845,243 A | * | 12/1998 | Smart et al. ............... | 704/230 |
| 5,987,417 A | * | 11/1999 | Heo et al. ................. | 704/500 |
| 6,091,773 A | * | 7/2000 | Sydorenko ................ | 704/222 |

FOREIGN PATENT DOCUMENTS

| | | |
|---|---|---|
| JP | 6-45943 | 2/1994 |
| JP | 6-224862 | 8/1994 |
| JP | 6-291737 | 10/1994 |
| JP | 8-186500 | 7/1996 |
| JP | 9-500252 | 1/1997 |
| JP | 9-214953 | 8/1997 |
| JP | 9-325797 | 12/1997 |
| JP | 10-233058 | 9/1998 |

* cited by examiner

Primary Examiner—David D. Knepper
(74) Attorney, Agent, or Firm—Staas & Halsey LLP

(57) ABSTRACT

An input separator separates the whole digital audio signal into a first audio signal belonging to the basic region and a second audio signal belonging to the extended region. A lossless encoder losslessly encodes the first audio signal and outputs a first bitstream and a first bit rate possessed by the first bitstream resulting from the lossless encoding. A psycho-acoustical encoder psycho-acoustically encodes the second audio signal and outputs a second bitstream and a second bit rate possessed by a second bitstream. The encoding apparatus encodes the input digital audio signal so that the sum of the first and second bit rates matches a predetermined bit rate. A decoding apparatus corresponding to the encoding apparatus losslessly decodes and psycho-acoustically decodes the bitstreams. Thus, by separately processing the audio information of a region supported by the DVD-video standard audio signal as a basic region and the audio information for providing a higher quality audio than that of the DVD-video standard as an extended region, a higher quality audio than that of the existing DVD-video standard can be provided. Thus, since the total bit rate can be maintained to be constant and the allowed total bit rate is used, to perform lossless encoding and psycho-acoustical encoding, software can be easily recorded on a recording medium, and a design specification such as a buffer size can be easily determined in hardware implementation.

26 Claims, 4 Drawing Sheets

HIGH QUALITY AUDIO ENCODING/DECODING APPARATUS AND DIGITAL VERSATILE DISC

CROSS-REFERENCE TO RELATED APPLICATIONS

This application claims the benefit of Korean Application No. 97-41285, filed Aug. 26, 1997, in the Korean Patent Office, the disclosure of which is incorporated herein by reference.

BACKGROUND OF THE INVENTION

1. Field of the Invention

The present invention relates to an audio encoding/decoding apparatus, and more particularly, to an audio encoding/decoding apparatus for providing higher quality audio than the quality provided by a digital versatile disc (DVD)-video standard. The present invention also relates to a DVD for recording/reproducing audio information by adding a recorder to an audio encoding apparatus and adding a reader to an audio decoding apparatus.

2. Description of the Related Art

There have been various compression techniques for efficiently transmitting and storing information such as video or audio data, which are classified into a lossless encoding method in which restored data is the same as original data which is not compressed and a lossy encoding method in which data loss occurs by compression and restoration. The lossless encoding method and lossy encoding method are used to provide high quality audio signals.

An existing lossless encoding method usually varies a compression rate according to data properties and compresses data according to the varied compression rate. Therefore, a transmission rate of bitstreams produced by compression does not become consistent. The lossless encoding method cannot restrict a bit rate to a constant value. Accordingly, if a bit rate is restricted compulsively, a loss of information occurs due to the limit of the bit rate. In other words, a constant bit rate does not mean lossless information.

Meanwhile, an existing lossy encoding method using an acoustic psychology analyzes an audio signal in order to remove an unnecessary portion and a lossy element of data and lower an accuracy for a less significant signal, and compresses the audio signal based on the analysis. The lossless encoding method can compress a signal into a constant bit rate. However, since a prior-to-being-compressed signal differs from a signal obtained by reproducing a compressed signal, it is difficult to reproduce an audio signal into a high quality audio signal. Particularly, in the case when an audio signal is compressed over the whole bands of the audio signal using an acoustic psychology, although a bit rate is sufficiently given, a loss of information occurs even in a fundamental band to which information which should be transmitted without any loss in view of a physiological sensation.

SUMMARY OF THE INVENTION

To solve the above problems, it is an object of the present invention to provide an encoding apparatus for compressing a high quality audio signal into a constant bit rate, using a combination of a psycho-acoustical encoding method which is an existing lossy coding method and an existing lossless coding method.

It is another object of the present invention to provide a decoding apparatus for restoring an audio signal encoded by the above encoding apparatus.

Additional objects and advantages of the invention will be set forth in part in the description which follows and, in part, will be obvious from the description, or may be learned by practice of the invention.

To accomplish the above and other objects and advantages of the present invention, there is provided an audio encoding apparatus including separation means for receiving a digital audio signal and separating the received digital audio signal into a first audio signal belonging to a first region and a second audio signal belonging to a second region, in which the whole audio region represented by the received digital audio signal is divided into the first and second regions; lossless encoding means for lossless encoding the first audio signal and outputting a first bitstream and a first bit rate possessed by the first bitstream resulting from the lossless encoding; and psycho-acoustical encoding means for psycho-acoustically encoding the second audio signal and outputting a second bitstream and a second bit rate possessed by a second bitstream, in which the second bit rate is a difference between a predetermined bit rate and the first bit rate.

There is also provided an audio decoding apparatus including an input port for receiving a first bitstream generated by losslessly encoding a digital audio signal belonging to a first region and a second bitstream generated by psycho-acoustically encoding a digital audio signal belonging to a second region, in which the sum of a first bit rate possessed by the first bitstream and a second bit rate possessed by the second bitstream is a predetermined bit rate and the whole audio region is divided into the first and second regions; lossless decoding means for losslessly decoding the first bitstream received via the input port and thus generating a first audio signal belonging to the first region of the whole audio region; psycho-acoustical decoding means for psycho-acoustically decoding the second bitstream received via the input port and thus generating the second audio signal belonging to the second region among the whole audio region; and combining means for combining the first and second audio signals and outputting the combined result.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now made in detail to the present preferred embodiments of the present invention, examples of which are illustrated in the accompanying drawings. The embodiments are described below in order to explain the present invention by referring to the figures.

A preferred embodiment of the present invention will be described with reference to the accompanying drawings.

Figure 1:
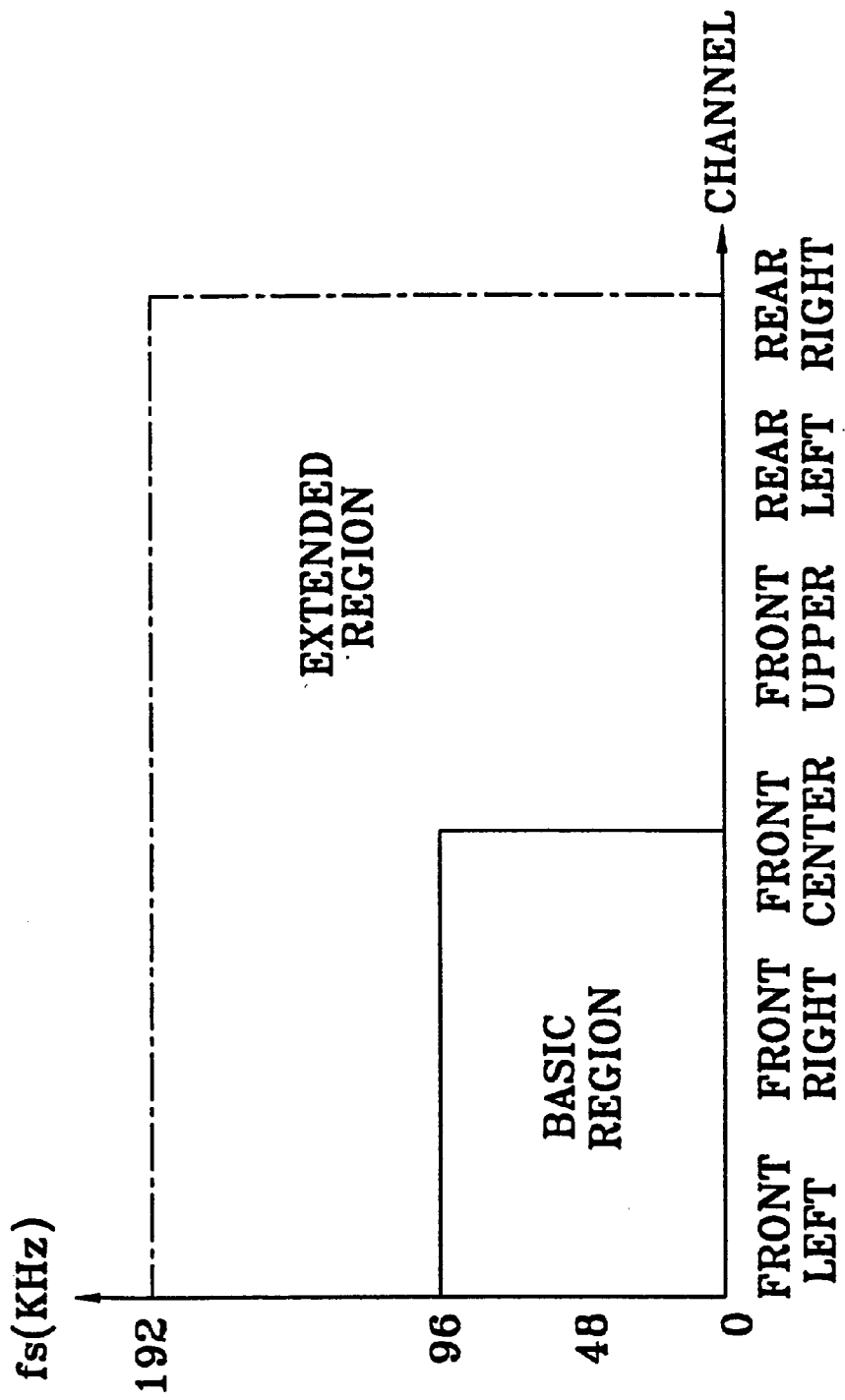
FIG. 1 is a view illustrating an example where the whole audio region is divided into a basic region and an extended region.

In the present invention, an audio signal region is divided into a basic region and an extended region. The audio signal belonging to the basic region is losslessly encoded and decoded, and the audio signal belonging to the extended region is psycho-acoustically encoded and decoded. The basic region is an area to which an audio signal which is relatively more significant in view of physiological sensation belongs and information which should be transmitted without any loss in view of physiological sensation belongs. The extended region is an area to which an audio signal which is relatively less significant belongs. FIG. 1 shows a case where a region is divided based on both channels and sampling frequencies, for use in the embodiment of the present invention. The whole audio region is represented by 6 channels and a sampling frequency of 192 KHz, and is divided into a basic region and an extended region. The basic region is defined by 3 channels such as a front left channel, a front right channel and a front center channel, among the 6 channels, and a sampling frequency of 96 KHz. The extended region is defined by the other 3 channels such as a front upper channel, a rear left channel and a rear right channel, among the 6 channels, and a sampling frequency which is larger than 96 KHz and smaller than 192 KHz. Therefore, such a region division can be used for a DVD-video standard which uses a sampling frequency of 96 KHz and a plurality of audio channels. However, the present invention is not limited to only the above region division. Thus, the above-described region division can be varied based on various audio specifications adopted in the DVD-video standard.

For example, if the basic region is a relatively lower frequency band among the whole frequency bands of an audio signal, the extended region becomes a relatively higher frequency band. If the basic region is a frequency band which represents audio matching the DVD-video standard, the extended region becomes a frequency band which represents audio having a higher quality than the DVD-video standard. The basic region and the extended region may be obtained by dividing only the whole audio channels according to the DVD-video standard into two.

Figure 2:
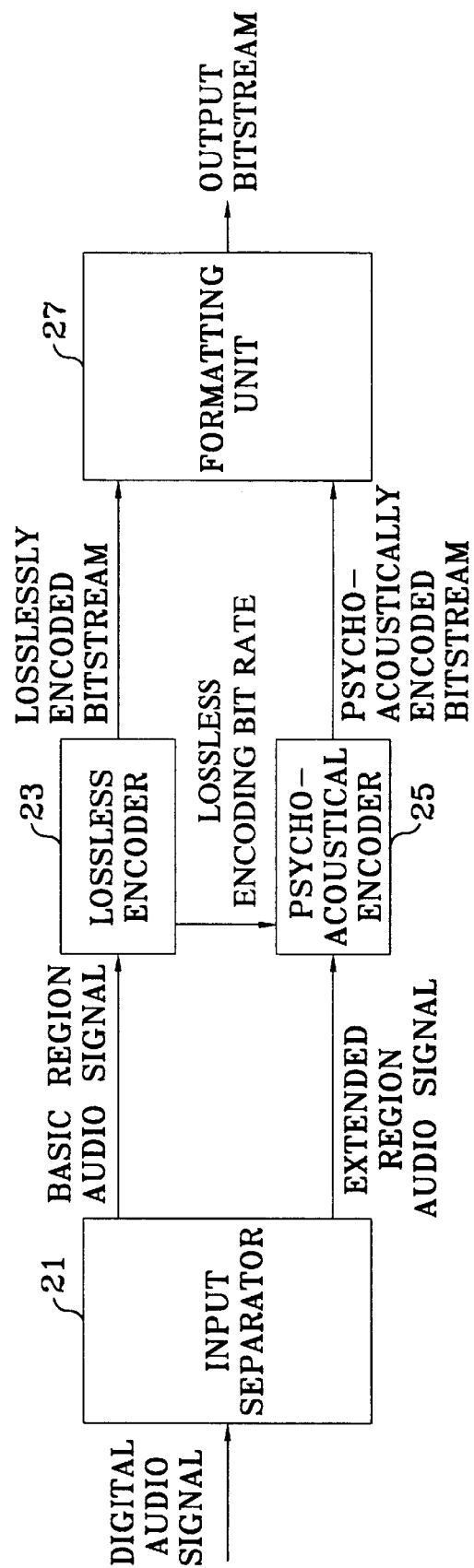
FIG. 2 is a block diagram showing an encoding apparatus according to a first embodiment of the present invention.

FIG. 2 is a block diagram showing an encoding apparatus according to a first embodiment of the present invention. In FIG. 2, an external digital audio signal is input to an input separator 21. A general linear PCM (pulse code modulation) method produces a digital audio signal matching an analog audio signal. Thus, a case when a linear PCM audio signal is input to the input separator 21 will be described below. The input separator 21 divides the externally input linear PCM audio signal into an audio signal belonging to the basic region and an audio signal belonging to the extended region, and outputs a basic region audio signal to a lossless encoder 23 and an extended region audio signal to a psychoacoustical encoder 25, respectively. The lossless encoder 23 encodes the received basic region audio signal using an existing lossless encoding method or methods. In particular, the lossless encoder 23 encodes the basic region audio signal so that a lossless encoding bit rate $B_{lossless}(t)$ is smaller than a predetermined total bit rate $B_{total}(t)$. The existing lossless encoding methods produce compressed and restored audio signals which are the same as the original audio signals which are not encoded, which are well-known to those who are skilled in the art. Thus, a detailed description thereof will be omitted. The lossless encoder 23 outputs the audio signal obtained by the lossless encoding in the form of a bitstream. The lossless encoder 23 also supplies the lossless encoding bit rate $B_{lossless}(t)$ representing a bit rate of the losslessly encoded bitstream to the psycho-acoustical encoder 25.

In more detail, the lossless encoder 23 calculates the lossless encoding bit rate $B_{lossless}(t)$ every predetermined interval of time and outputs the calculated lossless encoding bit rate $B_{lossless}(t)$ to the psycho-acoustical encoder 25. In the embodiment of the present invention, the lossless encoder 23 calculates and outputs the lossless encoding bit rate $B_{lossless}(t)$ in units of every 100 milliseconds. Also, considering a delay of an audio signal processing, it is well-known to one skilled in the art that the lossless encoder 23 varies an interval of calculating and outputting the lossless encoding bit rate $B_{lossless}(t)$. Therefore, the lossless encoder 23 can calculate and output the lossless encoding bit rate $B_{lossless}(t)$ in units of a predetermined frame. In this case, a length of one frame is a frame length of the lossless encoding method or the psycho-acoustical encoding method.

The psycho-acoustical encoder 25 calculates a psycho-acoustical encoding bit rate $B_{lossy}(t)$ relating to the extended region audio signal received from the input separator 21, based on the lossless encoding bit rate $B_{lossless}(t)$ supplied from the lossless encoder 23. In more detail, the psycho-acoustical encoder 25 calculates a difference between a stored predetermined total bit rate $B_{total}(t)$ and the lossless encoding bit rate $B_{lossless}(t)$ supplied from the lossless encoder 23, and determines the difference as the psycho-acoustical encoding bit rate $B_{lossy}(t)$. Here, the predetermined total bit rate $B_{total}(t)$ is the maximum bit rate of the bitstream output from the encoding apparatus shown in FIG. 2. The psycho-acoustical encoder 25 psycho-acoustically encodes the extended region audio signal supplied from the input separator 21 according to the determined psycho-acoustical encoding bit rate $B_{lossy}(t)$. There are various methods such as Dolby, AC-3, MPEG-1, MPEG-2, and DTS, as the existing psycho-acoustical encoding methods. Among them, the methods which can be used to provide a higher quality audio than the quality provided by the DVD-video standard, or the methods which can be used to provide a high quality audio which is substantially the same as the linear PCM, can be used in the psycho-acoustical encoder 25. The psycho-acoustical encoder 25 outputs the psycho-acoustically encoded audio signal in the form of a bitstream.

A formatting unit 27 formats the losslessly encoded bitstream output from the lossless encoder 23 and the psycho-acoustically encoded bitstream output from the psycho-acoustical encoder 25 into a single bitstream according to a predetermined format, and outputs the formatted bitstream as an output bitstream. The bitstream output from the formatting unit 27 has a constant bit rate and has a value which is the same as the above-described total bit rate $B_{total}(t)$.

Figure 3:
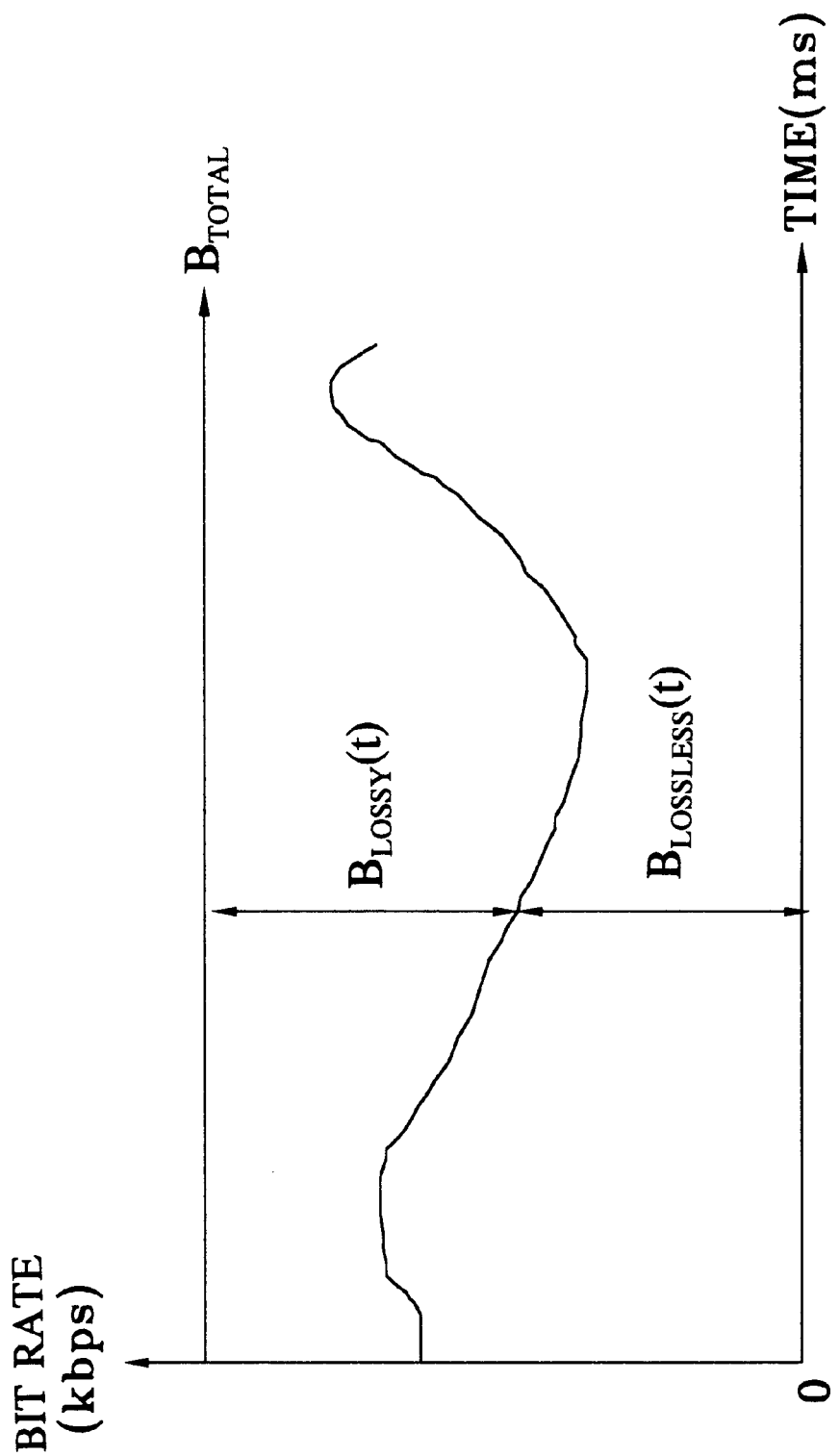
FIG. 3 is a graphical view for explaining a variation of bit rates of the bitstreams encoded by the apparatus shown in FIG. 2.

FIG. 3 shows a variation of the lossless encoding bit rate $B_{lossless}(t)$ and the psycho-acoustical encoding bit rate $B_{lossy}(t)$ in the encoding apparatus shown in FIG. 2, as related to the total bit rate $B_{total}(t)$. As shown in FIG. 3, when the lossless encoding bit rate $B_{lossless}(t)$ is varied, the encoding apparatus shown in FIG. 2 uses the total bit rate which is allowed for the lossless encoding and the psycho-acoustical encoding, while maintaining the total bit rate $B_{total}(t)$ as a constant value. Thus, when using the audio bitstream encoded by the encoding apparatus shown in FIG. 2, audio information can be easily recorded on a recording medium.

Figure 4:
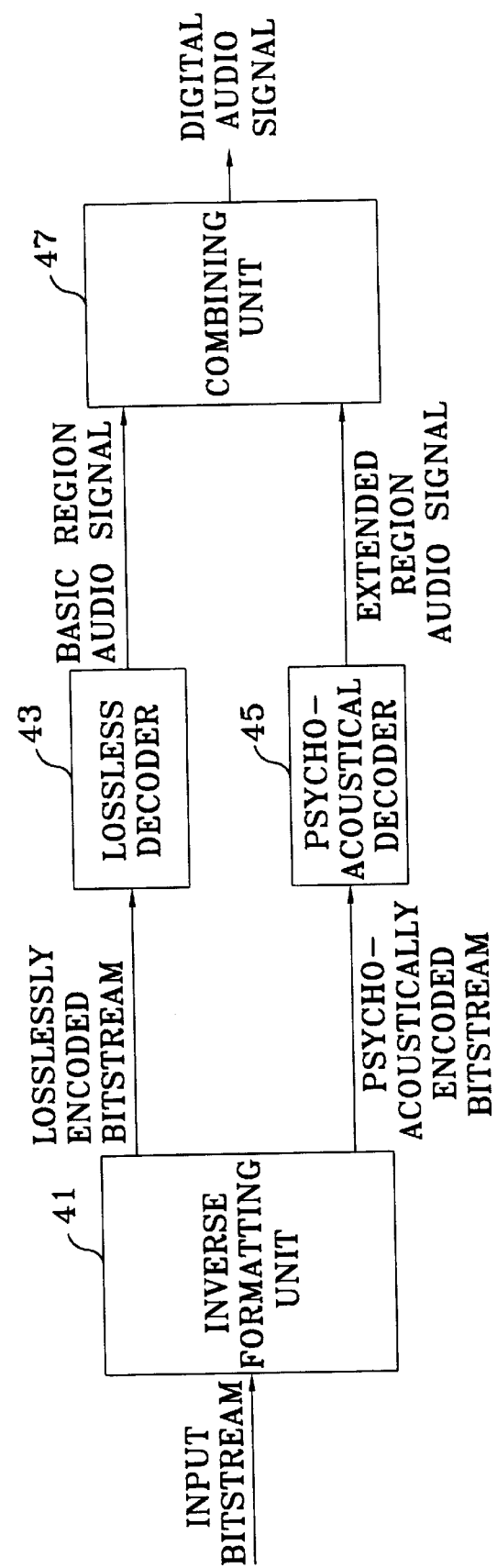
FIG. 4 is a block diagram showing a decoding apparatus corresponding to the apparatus shown in FIG. 2.

FIG. 4 is a block diagram showing a decoding apparatus for restoring a digital audio signal by using the bitstream produced by the FIG. 2 encoding apparatus. In FIG. 4, an inverse formatting unit 41 separates the received bitstream into a losslessly encoded bitstream and a psycho-acoustically encoded bitstream via an inverse process of the formatting unit 27 shown in FIG. 2. Among the bitstreams separated by the inverse formatting unit 41, the losslessly encoded bitstream is input to a lossless decoder 43, and the psycho-acoustically encoded bitstream is input to a psycho-acoustical decoder 45.

The lossless decoder 43 performs an inverse signal processing of the lossless encoder 23 with respect to the received losslessly encoded bitstream, and outputs a basic region audio signal resulting from the lossless decoding to a combining unit 47. The psycho-acoustical decoder 45 performs an inverse signal processing of the psycho-acoustical encoder 25 with respect to the received psycho-acoustically encoded bitstream, and outputs an extended region audio signal resulting from the psycho-acoustical decoding to the combining unit 47. The combining unit 47 combines the basic region audio signal supplied from the lossless decoder 43 and the extended region audio signal supplied from the psycho-acoustical decoder 45 and outputs a digital audio signal substantially the same as the prior-to-being-encoded original digital audio signal, that is, the linear PCM audio signal.

An encoding apparatus and a decoding apparatus according to a respectively modified second embodiment, which uses a recorder and a reader matching the DVD-video standard, instead of the formatting unit 27 shown in FIG. 2 and the inverse formatting unit 41 shown in FIG. 4, will be described below. In this case, a basic region matches an audio format defined by the DVD-video standard and an extended region becomes a region to which the other audio data belongs. The recorder records the losslessly encoded bitstream output from the lossless encoder 23 on a recording region in a digital versatile disc (DVD) defined by the DVD-video standard, and records the psycho-acoustically encoded bitstream output from the psycho-acoustical encoder 25 on a recording region in the DVD which is not defined by the DVD-video standard. Also, the reader reads the losslessly encoded bitstream and the psycho-acoustically encoded bitstream from the DVD on which the audio information has been recorded thereon by the recorder, respectively. Among the read bitstreams, the reader supplies the losslessly encoded bitstream to the lossless decoder 43 and the psycho-acoustically encoded bitstream to the psycho-acoustical decoder 45, respectively. Therefore, the modified encoding and decoding apparatuses can record the higher quality audio than the quality provided by the DVD-video standard on the DVD and can read the same from the DVD, while maintaining compatibility with the existing DVD-video standard.

Still another modified third embodiment for each of the FIGS. 2 and 4 apparatuses is possible. In this embodiment, the formatting unit 27 shown in FIG. 2 records a single bitstream obtained by combination of the losslessly encoded bitstream and the psycho-acoustically encoded bitstream, on a DVD, and the inverse formatting unit 41 of FIG. 4 reads the single bitstream recorded on the DVD and separates the read single bitstream into the losslessly encoded bitstream and the psycho-acoustically encoded bitstream. In this case, the DVD can be used as a dedicated DVD for the encoding and decoding apparatuses according to the above-described modified embodiments of the present invention.

As described above, the present invention divides the whole region of an audio signal into a basic region and an extended region. A basic region audio signal is losslessly encoded and an extended region audio signal is psycho-acoustically encoded. In particular, the present invention determines a bit rate of the psycho-acoustically encoded extended region audio signal based on the bit rate of the losslessly encoded basic region audio signal. Thus, the present invention can maintain the total bit rate to be constant and use the allowed total bit rate, in order to perform lossless encoding and psycho-acoustical encoding. Also, since the total bit rate is maintained constant, software can be easily recorded on a recording medium, and a design specification such as a buffer size can be easily determined in hardware implementation.

While only certain embodiments of the invention have been specifically described herein, it will be apparent that numerous modifications may be made thereto without departing from the spirit and scope of the invention.

What is claimed is:

1. An audio encoding apparatus for encoding a digital audio signal, comprising:
   a separation unit separating the digital audio signal into a first audio signal belonging to a first region and a second audio signal belonging to a second region, in which a whole audio region represented by the digital audio signal is divided into the first and second regions;
   a lossless encoding unit lossless encoding the first audio signal, to output a first bitstream and a first bit rate possessed by the first bitstream resulting from the lossless encoding; and
   a psycho-acoustical encoding unit psycho-acoustically encoding the second audio signal, to output a second bitstream and a second bit rate possessed by a second bitstream, in which the second bit rate is a difference between a predetermined bit rate and the first bit rate.

2. The audio encoding apparatus according to claim 1, wherein said digital audio signal is a linear pulse code modulation (PCM) audio signal.

3. The audio encoding apparatus according to claim 1, wherein said first region is a first audio signal region to which audio information which should be transmitted without any loss in view of physiological sensation belongs, and said second region is a second audio signal region which does not belong to said first region.

4. The audio encoding apparatus according to claim 1, wherein said first and second regions are obtained by dividing a total frequency band possessed by the digital audio signal in two, wherein said first region is a relatively low frequency band and said second region is a relatively high frequency band.

5. The audio encoding apparatus according to claim 4, wherein said first region includes the relatively low frequency band representing audio matching of a DVD-video standard and said second region includes the relatively high frequency band representing a higher quality audio than that of the DVD-video standard.

6. The audio encoding apparatus as claimed in claim 5, wherein the whole audio region has a sampling frequency of 192 KHz, the first region has a sampling frequency of 96 KHz, and the second region has a sampling frequency between 96 KHz and 192 KHz.

7. The audio encoding apparatus as claimed in claim 6, wherein the first region has a front left channel, a front right channel, a front center channel, and the second region has a front upper channel, a rear left channel and a rear right channel.

8. The audio encoding apparatus according to claim 1, wherein said first and second regions are obtained by dividing whole audio channels of the whole audio region in two according to a DVD-video standard.

9. The audio encoding apparatus according to claim 1, wherein said first and second regions are obtained by dividing both a whole frequency band and whole channels of the whole audio region possessed by the digital audio signal in two, in which said first region belongs to a relatively lower frequency band and part of the channels, and said second region belongs to a relatively higher frequency band and the other channels.

10. The audio encoding apparatus according to claim 9, wherein said first region includes a first frequency band representing audio matching of the DVD-video standard and said second region includes a second frequency band representing a higher quality audio than that of the DVD-video standard.

11. The audio encoding apparatus according to claim 1, wherein said lossless encoding unit detects and outputs the first bit rate every predetermined interval of time and said psycho-acoustical encoding unit encodes the second audio signal corresponding to the first audio signal which has been used for detection of the first bit rate so that the second audio signal has the second bit rate.

12. The audio encoding apparatus as claimed in claim 11, wherein the predetermined time interval is a length of one frame of the lossless encoding performed by said lossless encoding unit.

13. The audio encoding apparatus according to claim 1, further comprising a formatting unit for formatting the first and second bitstreams into an output bitstream having a predetermined bit rate.

14. The audio encoding apparatus according to claim 13, further comprising a recording unit recording the output bitstream from said formatting unit on a DVD.

15. The audio encoding apparatus according to claim 1, further comprising a recording unit recording the first bitstream on a first audio recording region of a DVD defined by the DVD-video standard and recording the second bitstream on a second audio recording region of the DVD which is not defined by the DVD-video standard, when the first bitstream contains audio information according to the DVD-video standard and the second bitstream contains audio information for providing a higher quality audio than that of the DVD-video standard.

16. The audio encoding apparatus as claimed in claim 1, wherein the whole audio region has a sampling frequency of 192 KHz, the first region has a sampling frequency of 96 KHz, and the second region has a sampling frequency between 96 KHz and 192 KHz.

17. The audio encoding apparatus as claimed in claim 16, wherein the first region has a front left channel, a front right channel, a front center channel, and the second region has a front upper channel, a rear left channel and a rear right channel.

18. An audio decoding apparatus, comprising:
an input port to receive the first and second bitstreams, wherein the first bitstream is generated by losslessly encoding a first region of a digital audio signal and the second bitstream is generated by psycho-acoustically encoding a second region of the digital audio signal, in which a sum of a first bit rate possessed by the first bitstream and a second bit rate possessed by the second bitstream is a predetermined bit rate;

a lossless decoding unit losslessly decoding the first bitstream received via the input port, to generate a first audio signal belonging to the first region of a whole audio region, wherein the whole audio region of the digital audio signal is divided into the first and second regions;

a psycho-acoustical decoding unit psycho-acoustically decoding the second bitstream received via the input port, to generate a second audio signal belonging to the second region of the whole audio region; and a combining unit combining the first and second audio signals and outputting the combined result.

19. The audio decoding apparatus according to claim 18, wherein the first region is a first audio signal region to which audio information which should be transmitted without any loss in view of physiological sensation belongs, and said second region is a second audio signal region which does not belong to said first region.

20. The audio decoding apparatus according to claim 18, wherein said first and second regions are obtained by dividing a total frequency band possessed by the digital audio signal in two, wherein said first region is a relatively low frequency band and said second region is a relatively high frequency band.

21. The audio decoding apparatus according to claim 20, wherein said first region includes the relatively low frequency band representing audio matching of a DVD-video standard and said second region includes the relatively high frequency band representing a higher quality audio than that of the DVD-video standard.

22. The audio decoding apparatus according to claim 18, wherein said first and second regions are obtained by dividing the whole audio channels of the whole audio region in two according to a DVD-video standard.

23. The audio decoding apparatus according to claim 18, wherein said first and second regions are obtained by dividing both a whole frequency band and whole channels of the whole audio region possessed by the audio signal in two, in which said first region belongs to a relatively lower frequency band and part of the channels, and said second region belongs to a relatively higher frequency band and the other channels.

24. The audio decoding apparatus according to claim 23, wherein said first region includes a first frequency band representing audio matching of a DVD-video standard and said second region includes a second frequency band representing a higher quality audio than that of the DVD-video standard.

25. The audio decoding apparatus according to claim 23, further comprising a reading unit reading the first and second bitstreams from a DVD wherein the first bitstream containing audio information according to the DVD-video standard is recorded on a first audio recording region of the DVD defined by the DVD-video standard and the second bitstream containing audio information for providing a higher quality audio than that of the DVD-video standard on a second audio recording region of the DVD which is not defined by the DVD-video standard, and supplies the read result to said input port.

26. The audio decoding apparatus according to claim 18, further comprising:
a reading unit reading a single bitstream from a DVD wherein the first bitstream containing audio information according to the DVD-video standard and the second bitstream containing audio information for providing higher quality audio than that of the DVD-video standard are recorded in a form of the single bitstream; and a separation unit separating the first and second bitstreams from the single bitstream read from said reading unit and supplying the separated result to said input port.

* * * * *